（12） United States Patent
Saito

(10) Patent No.: US 7,661,740 B2
(45) Date of Patent: Feb. 16, 2010

(54) VEHICULAR INTERIOR PART AND METHOD OF FABRICATING THE SAME

(75) Inventor: Kazuhiro Saito, Saitama (JP)

(73) Assignee: Calsonic Kansei Corporation, Tokyo (JP)

( * ) Notice: Subject to any disclaimer, the term of this patent is extended or adjusted under 35 U.S.C. 154(b) by 696 days.

(21) Appl. No.: 11/365,931

(22) Filed: Mar. 2, 2006

(65) Prior Publication Data

US 2006/0197321 A1  Sep. 7, 2006

(30) Foreign Application Priority Data

Mar. 4, 2005  (JP) ............................. 2005-060845

(51) Int. Cl.
*B60J 7/00* (2006.01)
*B62D 39/00* (2006.01)
(52) U.S. Cl. .................. 296/1.08; 296/70; 296/146.7
(58) Field of Classification Search ............... 296/1.08, 296/701, 146.7; 428/31; 112/402, 420, 440, 112/439
See application file for complete search history.

(56) References Cited

U.S. PATENT DOCUMENTS

| 2,430,087 | A | | 11/1947 | Stritter |
| 4,488,498 | A | | 12/1984 | Smith |
| 4,711,190 | A | | 12/1987 | Smith |
| 6,177,155 | B1 | * | 1/2001 | Kurosaki ..................... 428/31 |
| 7,401,829 | B2 | * | 7/2008 | Michalski et al. .......... 296/1.08 |
| 2002/0156500 | A1 | | 10/2002 | Storz-Irion et al. |
| 2004/0138683 | A1 | | 7/2004 | Shelton et al. |

FOREIGN PATENT DOCUMENTS

| JP | 3-132437 A | 6/1991 |
| JP | 7-004819 B2 | 5/1992 |
| WO | WO 01/80746 A1 | 11/2001 |

\* cited by examiner

*Primary Examiner*—Joseph D Pape
(74) *Attorney, Agent, or Firm*—Foley & Lardner LLP

(57) ABSTRACT

A core, a flexible pad covering the core and a synthetic resinous skin covering the pad are layered each other. A thread is arranged on a surface side of the skin and has portions inserted in grooves of the pad through through-holes of the skin. Stoppers engage a rear side of the skin for stopping the portions of the thread from coming off from the skin. A sewing line is formed along the though-holes.

7 Claims, 4 Drawing Sheets

VEHICULAR INTERIOR PART AND METHOD OF FABRICATING THE SAME

CROSS-REFERENCE TO RELATED APPLICATIONS

This application is based upon and claims the benefit of priority from Japanese Patent Application No. 2005-060845 filed on Mar. 4, 2005; the entire contents of which are incorporated herein by reference.

BACKGROUND OF THE INVENTION

The invention relates to a vehicular interior part such as an instrumental panel and a door trim, and to a method of fabricating the same.

More particularly, the invention relates to a high-class look vehicular interior part having realistic sewing lines formed on the surface of a skin material of a synthetic resin member, and to a method of fabricating the same.

A vehicle includes vehicular interior parts such as an instrumental panel installed in a vehicle interior, and a door trim. The interior parts are made from soft materials to achieve protection of passengers. At the same time, the interior parts contribute to improvement in the sense of beauty in the interior. Particularly, a high-class look product requires creating a sense of handmade. Thus, there has been proposed a vehicular interior material according to the following manufacturing steps (for example, see Japanese Patent Laid-Open Application Publication After Examination No. Hei 7 (1995)-004819). A skin material is stitched with an actual thread when the material is at the stage of a single item. Thus, sewing lines are formed on the surface of the skin material. Next, a pad is attached to the rear surface of the skin material, and the skin material is integrated with a core member. Thus, the interior material is completed.

The related technology described above, however, might involve occurrence of fold wrinkles caused by forming the covering skin into a three-dimensional shape. Once the fold wrinkles occur, it is hard to remove the wrinkles even by heat treatment. During foam molding in subsequent steps, a material of the pad might leak from stitches. The fold wrinkles increase a proportion defective. Thus, the fold wrinkles might cause deterioration of production efficiency and might be one of the causes of manufacturing costs rise. Usually, the pad flexes when the thread is tightened. And then, slightly dented path is formed where the thread of the skin material passes. This path produces high-class look. The sewing lines are formed at the stage of only the skin material. Thus, a product may give an impression of low-class look that the thread is attached to only the surface of the skin material.

SUMMARY OF THE INVENTION

The invention is directed to a vehicular interior part which has intended high-class look sewing lines formed thereon, and to a method of fabricating the same.

The invention is also directed to a vehicular interior part with lower manufacturing costs and to a method of fabricating the same.

A first aspect of the invention provides a vehicular interior part. The interior part includes a core (7), a flexible pad (6) covering the core and a synthetic resinous skin (5) covering the pad, layered each other. The interior part includes a thread (4) arranged on a surface side (5a) of the skin and having portions (4a) inserted in grooves of the pad through through-holes (14) of the skin. The interior part includes stoppers (10, 20, 25, 30, 4c1, 4c2) engaging a rear side (5b) of the skin for stopping the portions of the thread from coming off from the skin. A sewing line is formed along the though-holes (14).

The stoppers may be firmly held by the portions of the thread in accordance with pitches between the through-holes. The stoppers may have anchor members (10, 20) having approximately dart-shaped cross sections facilitating the anchor members to be inserted into the through-holes and to engage the rear side of the skin in the grooves.

The stoppers may include adhesives (25) fixed to the portions of thread and having greater sizes than the through-holes do.

The stoppers may include rings (30) with certain widths. The rings have the portions of the thread passing therethrough and engaging the rear side of the skin in the grooves.

The stoppers may include tags (4c1, 4c2) with certain widths. The tags fold the portions of the thread with pitches between the through-holes and engage the rear side of the skin in the grooves.

A second aspect of the invention provides a method of fabricating a vehicular interior part. The method includes the step of forming a layered arrangement with an interior part including a core, a flexible pad covering the core and a synthetic resinous skin covering the pad. The method includes the step of forming the skin with through-holes. The method includes the step of forming the pad with grooves coinciding with the through-holes. The method includes the step of inserting portions of a thread into the grooves through the through-holes. The method includes the step of holding the portions of the thread in the grooves by stoppers to form a sewing line along the grooves.

The method may include the step of holding anchor members as the stoppers by pressing members using vacuum suction. The method may include the step of inserting the pressing members holding the anchor members into the grooves through the through-holes. The method may include the step of removing the pressing members from the anchor members to remain the anchor members in the grooves by eliminating vacuum suction force.

According to the first aspect, pulling of the thread on the surface side using stoppers allows the skin and the pad to be flexed at the portions having the thread passing therethrough. This operation forms a high-class look sewing line on the skin as if sewing is done by a craftsman. After forming a three-dimensional structure, the through-holes and the grooves are formed and the thread is provided. This formation does not produce leakage of the pad from the through-holes, or wrinkle, thus reducing a proportion defective, thus enhancing production efficiency. This reduces manufacturing costs.

Inserting of the anchor members coincidently into the through-holes allows the thread to enter the grooves with the anchor members and to be held. This holding structure gives people seeing high-class look as if the thread is sewed with a back-side thread and a front-side thread.

Inserting of the rings having the thread passing through allows the thread to enter grooves with the rings and to be held. This holding structure gives people seeing high-class look as if the thread is sewed with a back-side thread and a front-side thread.

Inserting of the tags coincidently into the grooves allows the once contracted tags to spread in the grooves larger than the through-holes for holding. This holding structure gives people seeing high-class look as if the thread is sewed with a back-side thread and a front-side thread.

According to the second aspect, the method facilitates the anchors to be held beside the benefits of the first aspect.

BRIEF DESCRIPTION OF THE ACCOMPANYING DRAWINGS

DETAILED DESCRIPTION OF THE PREFERRED EMBODIMENTS

Figure 1:
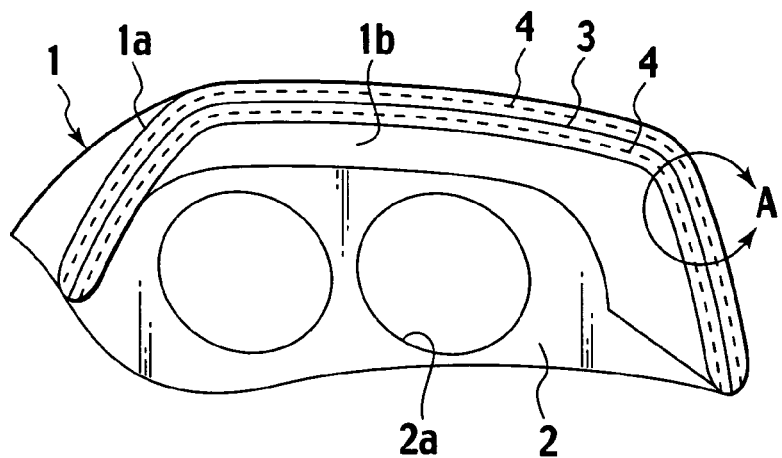
FIG. 1 is a perspective view showing a portion of an instrumental panel according to a first embodiment of the present invention.

For the purpose of providing a vehicular interior part with low manufacturing costs, in which intended high class-look sewing lines are formed, and providing a method of fabricating the same, an interior part has a core member, a flexible pad covering the core member, and a synthetic resin skin material covering the pad, which are stacked in layers. The interior part includes: a thread disposed on a surface of the skin material; and stoppers which prevent a portion of the thread from being pulled out by engaging the portion with a rear surface of the skin material when the portion of the thread is inserted into grooves formed in the pad through a plurality of through-holes which are continuously formed in the skin material. The interior part is achieved by forming sewing lines along the through-holes. With reference to the drawings, embodiments of the present invention will be described below.

First Embodiment

With reference to FIGS. 1 to 5, a first embodiment of the invention will be described. The front of a vehicle interior has an instrumental panel 1 as an "vehicular interior part", which is disposed in a width direction of a vehicle. The instrumental panel 1 is formed with a front side 1a and a back side 1b in the shape of a canopy. The instrumental panel 1 has a member 2 which holds unillustrated meters, and the member 2 is disposed below the instrumental panel 1. The member 2 defines openings having the meters exposed therein. The instrumental panel 1 has a groove-like guide portion 3 in the canopy. At both edges of the guide portion 3, there are sewing lines (also called stitches) of threads 4 as if sewing is done with a needle and thread.

The instrumental panel 1 includes a synthetic resin core member (also called a panel main body) 7. The instrumental panel 1 includes a flexible pad (also called an instrumental panel pad) 6 which covers the core member 7. The instrumental panel 1 includes a synthetic resin skin material 5 which covers the pad 6. The instrumental panel 1 includes the core member 7, the pad 6 and the skin material 5, which are stacked in layers.

Figure 2:
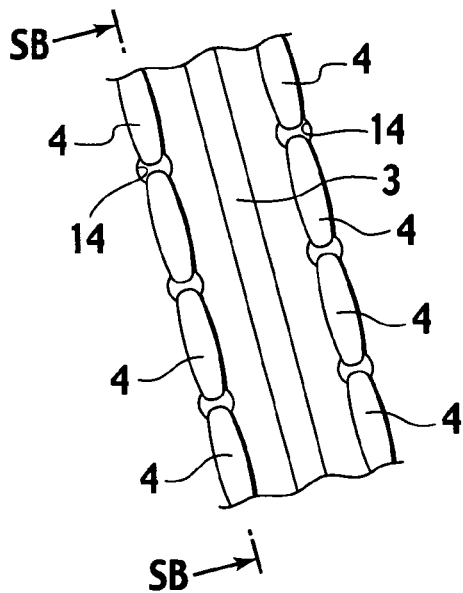
FIG. 2 is an enlarged view of the portion A in FIG. 1.
Figure 3:
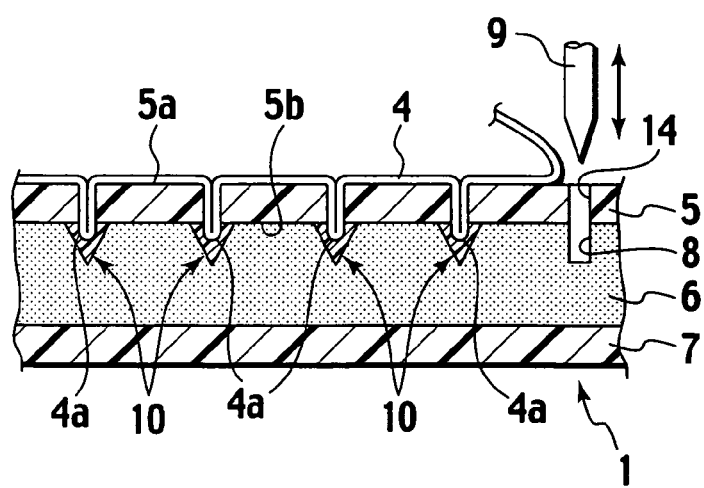
FIG. 3 is an enlarged longitudinal-sectional view along the line SB-SB in FIG. 2.
Figure 5:
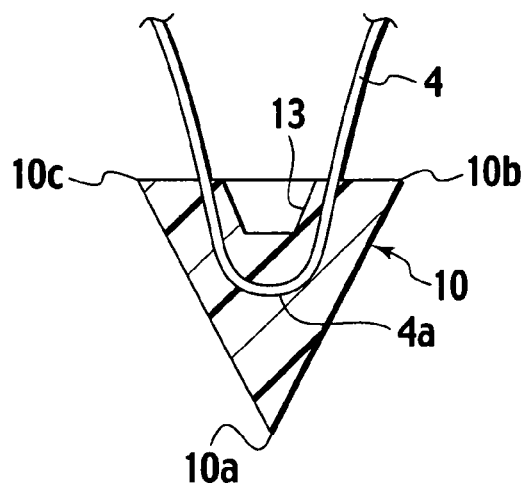
FIG. 5 is a cross-sectional view showing a structure in which the pushing member is removed from the anchor member in FIG. 4.

The thread 4 supports a plurality of anchor members 10, which are "stoppers", in hanging them like icicles arranged at equal intervals as shown in FIG. 5. The skin material 5 of the instrumental panel 1 has a plurality of through-holes 14 which are continuously provided therein at arbitrary (or intended) intervals with hole-opening needle 9. The pad 6 has grooves 8 at the identical positions to those of the through-holes 14. In the above state, the thread 4 is disposed on the surface 5a of the skin material 5. The portion 4a of the thread 4, by which the anchor member 10 is hung, is inserted into the through-hole 14 together with the anchor member 10. The pad 6 is flexed at the grooves 8, and the inserted anchor member 10 is engaged with the rear surface 5b of the skin material 5, thus preventing the thread 4 from being pulled out. Thus, the thread 4 disposed on the surface 5a of the skin material 5 along the through-holes 14 forms a sewing line as shown in FIG. 2.

Next, description will be given for a method of inserting the anchor member 10 into the through-hole 14 in the skin material 5.

Figure 4:
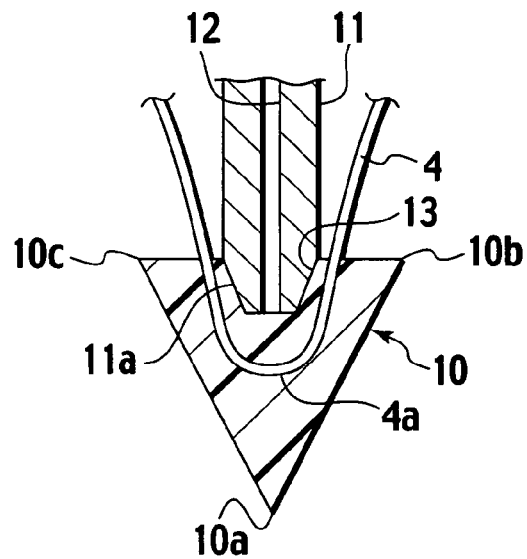
FIG. 4 is a longitudinal-sectional view showing a structure in which a pushing member is set in an anchor member "stopper" in FIG. 3.

As shown in FIGS. 4 and 5, a plurality of the anchor members 10 are firmly held by the respective portions 4a of the thread 4 in accordance with a pitch of the through-holes 14. The anchor member 10 has a pointed tip portion 10a so as to be easily inserted into the through-hole 14. The anchor member 10 has fixing portions 10b and 10c, each of which has an approximately dart-shaped cross section for the tip portion 10a, so as to be easily engaged with the rear surface 5b of the skin material 5 in the groove 8. The angle of the tip portion 10a may be 30 degrees or less and may be 30 degrees or more depending on material and hardness of the skin material 5.

The anchor member 10 has a concave portion 13 between the engaging portions 10b and 10c. A pushing member 11 has a tip portion 11a which close contacts with the concave portion 13. The anchor member 10 is attracted by an unillustrated aspirator using the air vent hole 12 of the pushing member 11. Accordingly, the pushing member 11 holds the concave portion 13 of the anchor member 10 by vacuum suction. The anchor member 10 and the pushing member 11, which are combined, are inserted into the groove 8 through the through-hole 14 in the skin material 5. By eliminating the vacuum suction power applied to the pushing member 11 or by applying an air pressure thereto, the tip portion 11a of the pushing member 11 is detached from the concave portion 13 of the anchor member 10. The pad 6 presses the engaging portions 10b and 10c against the rear surface 5b of the skin material 5 under an elastic force. Accordingly, only the anchor member 10 remains in the groove 8. Thus, the portion 4a of the thread 4 is held in the through-hole 14 together with the anchor member 10.

According to this embodiment, the thread 4 on the surface 5a of the skin material 5 is pulled by use of the anchor members 10. This pulling allows for flexing of the skin material 5 and the pad 6 having the portions 4a of the thread 4 passing therethrough. Thus, high-class look sewing lines as if sewing is done by a craftsman are formed on the skin material 5. After the instrumental panel 1 is formed into a three-dimensional shape, the through-holes 14 and the grooves 8 are formed and the thread 4 is provided. The method described above does not produce leakage of the pad 6 from the through-holes 14, or wrinkles. This reduces a proportion defective, thus enhancing production efficiency. Therefore, manufacturing costs are reduced.

A plurality of the anchor members 10 are held firmly by the respective portions 4a of the thread 4 in accordance with the pitch between the through-holes 14. The anchor member 10 is formed to have the approximately dart-shaped cross section so as to be easily inserted into the through-hole 14 and to be easily engaged with the rear surface 5b of the skin material 5 in the groove 8. Inserting of the anchor member 10 coincidently in the through-hole 14 permits the portion 4a of the thread 4 to enter the groove 8 together with the anchor member 10 and to be held therein. The holding structure provides high-class look as if the thread 4 is sewed with a back-side thread and a front-side thread to the people seeing it.

Figure 6:
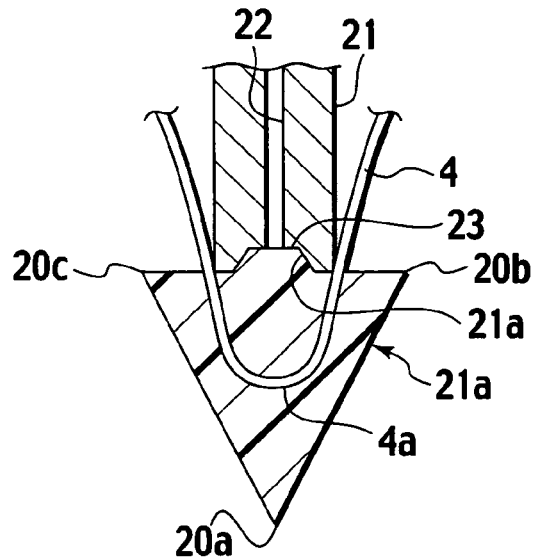
FIG. 6 is a cross-sectional view of a modified example, showing a structure in which a pushing member is set in an anchor member according to the first embodiment of the invention.
Figure 7:
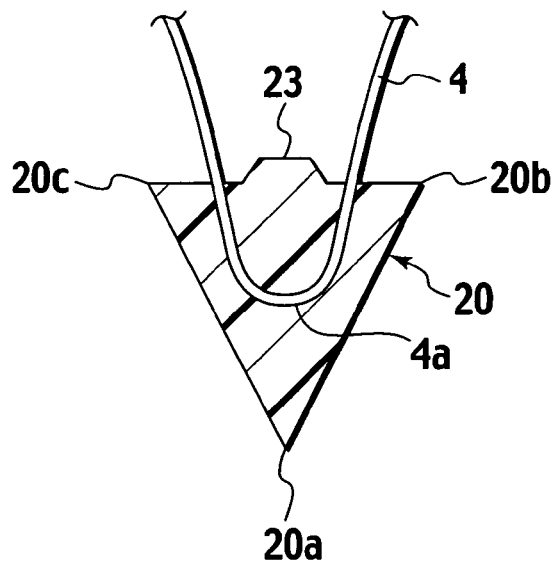
FIG. 7 is a cross-sectional view showing a structure in which the pushing member is removed from the anchor member in FIG. 6.

A relationship between the anchor member 10 and the pushing member 11 is not limited to the example shown in FIGS. 4 and 5. The relationship may be the one between an anchor member 20 and a pushing member 21 shown in FIGS. 6 and 7. Specifically, a plurality of the anchor members 20 are firmly held by respective portions 4a of a thread 4 in accordance with a pitch of through-holes 14. The anchor member 20 has a pointed tip portion 20a so as to be easily inserted into the through-hole 14. The anchor member 20 has engaging portions 20b and 20c having an approximately dart-shaped cross sections facing to the tip portion 20a, so that the anchor member 20 easily engage the rear surface 5b of a skin material 5 in a groove 8.

The anchor member 20 has a convex portion 23 between the engaging portions 20b and 20c. The convex portion 23 contacts with the tip portion 21a of the pushing member 21 under pressure. The anchor member 20 is attracted by an unillustrated aspirator using an air vent hole 22 formed through the pushing member 21. Accordingly, the pushing member 21 holds the convex portion 23 of the anchor member 20 by vacuum suction. The anchor member 20 and the pushing member 21, which are combined, are inserted into the groove 8 through the through-hole 14 in the skin material 5. Eliminating of the vacuum suction power applied to the pushing member 21 permits only the anchor member 20 to be remained in the groove 8. Thus, the portion 4a of the thread 4 is held in the through-hole 14 together with the anchor member 20.

Second Embodiment

Figure 8:
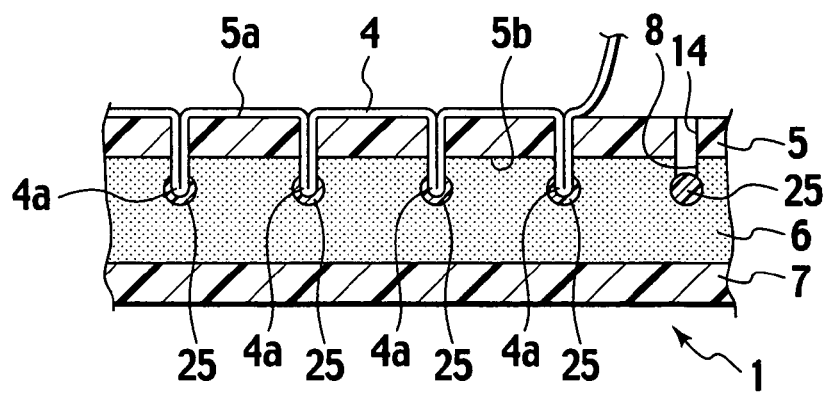
FIG. 8 is a longitudinal-sectional view equivalent to FIG. 3, showing an instrumental panel according to a second embodiment of the invention.

With reference to FIG. 8, a second embodiment of the invention will be described. A primary difference between the first and second embodiments is a stopper structure in the instrumental panel 1.

A thread 4 has a plurality of adhesives 25, which are "stoppers". The adhesive 25 is provided in a groove 8 and has a diameter larger than that of a through-hole 14. The adhesive 25 firmly fixes a portion 4a of the thread 4. The adhesive 25 engages with the rear surface 5b of a skin material 5 and prevents the portion 4a from being pulled out. Thus, the thread 4 is disposed on the surface 5a of the skin material 5 along the through-holes 14, and forms a sewing line.

According to this embodiment, the portion 4a of the thread 4 on the surface 5a of the skin material 5 is inserted into the through-hole 14 and the groove 8, and is fixed to the adhesive 25. This structure allows for flexing of the skin material 5 and the pad 6 having the portions 4a of the thread 4 passing therethrough. Thus, high-class look sewing lines as if sewing is done by a craftsman are formed on the skin material 5. After the instrumental panel 1 is formed into a three-dimensional shape, the through-holes 14 and the grooves 8 are formed and the thread 4 is provided. This structure described above does not produce leakage of the pad 6 from the through-holes 14, or wrinkles, thus reducing a proportion defective and enhancing production efficiency. Therefore, manufacturing costs are reduced.

A plurality of the anchor members 10 are firmly held by the respective portions 4a of the thread 4 in accordance with a pitch between the through-holes 14. The anchor member 10 is formed in an approximately dart-shaped cross section so as to be easily inserted into the through-hole 14 and to be easily engaged with the rear surface 5b of the skin material 5 in the groove 8. Insertion of the anchor member 10 coincidently in the through-hole 14 permits the portion 4a of the thread 4 to be inserted into the groove 8 together with the anchor member 10 and to be held therein. The holding structure provides high-class look as if the thread 4 is sewed with a back-side thread and a front-side thread to the people who saw it.

Third Embodiment

Figure 9:
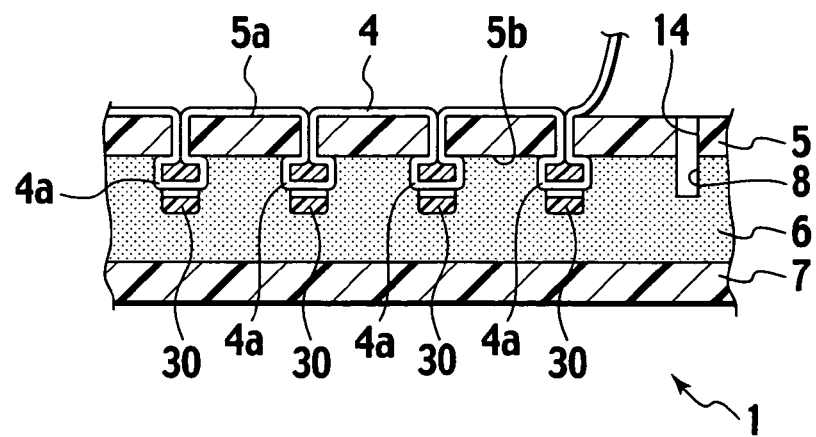
FIG. 9 is a longitudinal-sectional view equivalent to FIG. 3, showing an instrumental panel according to a third embodiment of the invention.
Figure 10:
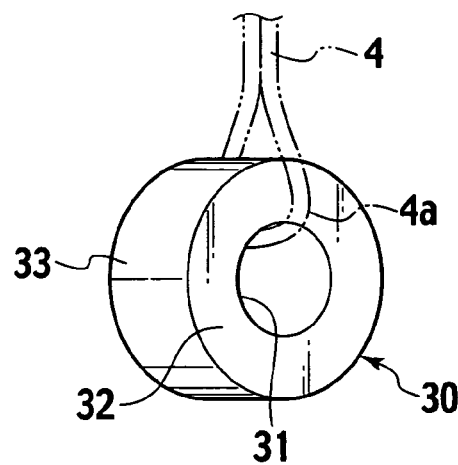
FIG. 10 is a perspective view of a ring in FIG. 9.

With reference to FIGS. 9 and 10, a third embodiment of the invention will be described. A primary difference between the first and third embodiments is a stopper structure in the instrumental panel 1.

A thread 4 is threaded through a plurality of rings 30 as "stoppers". The ring 30 has an inner hole 31 having the thread 4 passing therethrough. The ring 30 has an outer ring 33 to be engaged with the rear surface 5b of a skin material 5, and a face 32. A size of the ring 30 may be appropriately selected according to a position where the ring is buried, from a bead size to a finger ring size.

The skin material 5 of the instrumental panel 1 has a plurality of through-holes 14 which are formed by a hole-opening needle 9 (see FIG. 3) as in the case of the first embodiment. The pad 6 has grooves 8 at the identical positions to those of the through-holes 14. In the above state, the thread 4 is disposed on the surface 5a of the skin material 5, and the ring 30 is inserted into the through-hole 14. The pad 6 is flexed at the grooves 8, and the inserted ring 30 is engaged with the rear surface 5b of the skin material 5 by elasticity of the pad 6. The ring 30 prevents the thread 4 from being pulled out.

The thread 4 threaded through the rings 30 forms a sewing line as shown in FIG. 2 on the surface 5a of the skin material 5 along the through-holes 14.

According to this embodiment, the thread 4 on the surface 5a of the skin material 5 is pulled by the rings 30. This pulling allows for flexing of the skin material 5 and the pad 6 having the portions 4a of the thread 4 passing therethrough. Thus, high-class look sewing lines as if sewing is done by a craftsman are formed on the skin material 5. After the instrumental panel 1 is formed into a three-dimensional shape, the through-holes 14 and the grooves 8 are formed and the thread 4 is provided. This structure described above does not produce leakage of the pad 6 from the through-holes 14, or wrinkles. This reduces a proportion defective, thus enhancing production efficiency. Therefore, manufacturing costs are reduced.

Inserting of the rings 30 having the thread 4 passing therethrough permits the thread 4 to enter the groove 8 together with the rings 30 and to be held therein. This holding structure provides high-class look as if sewing is done with a back-side thread and a front-side thread to the people who saw it.

Fourth Embodiment

Figure 11:
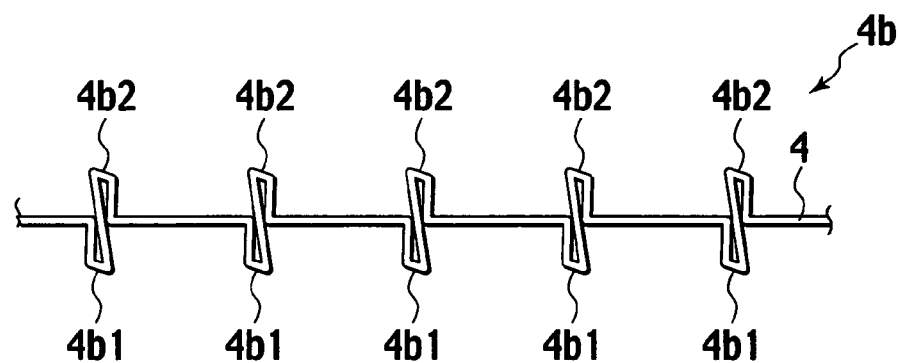
FIG. 11 is a top view of a primary product of a thread according to a fourth embodiment of the invention.

With reference between FIGS. 11 to 13, a fourth embodiment of the invention will be described. A primary difference between the first and fourth embodiments is a stopper structure in the instrumental panel 1.

Figure 12:
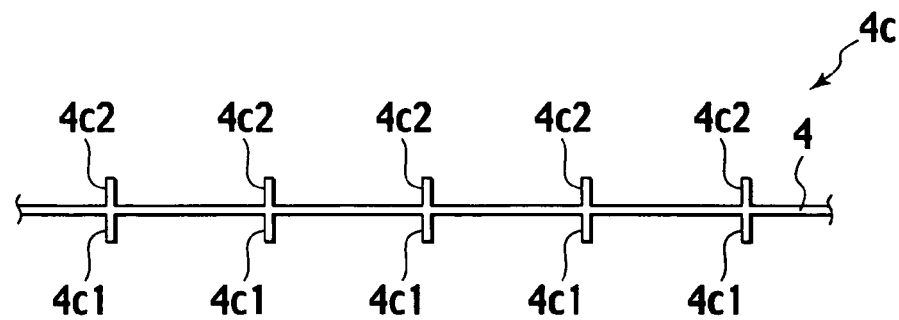
FIG. 12 is a top view showing that folded portions of the thread in FIG. 11 made into tags.
Figure 13:
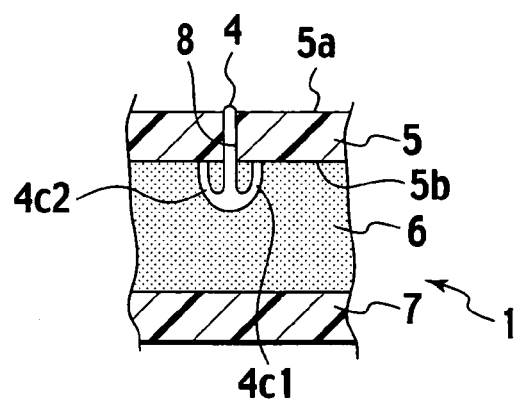
FIG. 13 is a cross-sectional view in a direction of crossing that of FIG. 9, showing a structure in which the thread is locked on the rear surface of a skin material of the instrumental panel with the tag shown in FIG. 12.

A thread 4 has a plurality of tags 4c1 and 4c2, which are "stoppers" shown in FIG. 12. As a structure of the tags 4c1 and 4c2 before secondary products, portions of the thread 4 are folded-back in coincidence with a pitch of through-holes 14. Thus, folded-back portions 4b1 and 4b2 (primary products) are formed, which have a predetermined width which is longer than a diameter of the through-hole 14 and is easily engaged with the rear surface 5b of a skin material 5.

The folded-back portions 4b1 and 4b2 are heated to form the tags 4c1 and 4c2. By inserting the tags 4c1 and 4c2 into the through-holes 14, the once folded tags 4c1 and 4c2 are unfolded again in the pad 6 to engage with the rear surface 5b of the skin material 5. This structure prevents the tags 4c1 and 4c2 from being pulled out. The thread 4 is disposed on the surface 5a of the skin material 5 along the through-holes 14 and forms a sewing line.

According to this embodiment, the tags 4c1 and 4c2 of the thread 4 on the surface 5a of the skin material 5 are inserted into the through-holes 14 and the grooves 8 for locking. This locking allows thread 4 to be pulled from both sides, and the skin material 5 and the pad 6 having the thread 4 passing therethrough to be flexed. Thus, high-class look sewing lines as if sewing is done by a craftsman are formed on the skin material 5. After the instrumental panel 1 is formed in a three-dimensional shape, the through-holes 14 and the grooves 8 are formed and the thread 4 is provided.

This structure described above does not produce leakage of the pad 6 from the through-holes 14, or wrinkles. This reduces a proportion defective, thus enhancing production efficiency. Therefore, manufacturing costs are reduced.

The portions of the tags 4c1 and 4c2 of the thread 4 are inserted into the grooves 8 coincidently in the through-holes 14. The tags 4c1 and 4c2 once contracted in the through-holes 14 are extended in the grooves 8. The tags 4c1 and 4c2 spreads out larger than the through-holes 14 and are held therein. This holding structure provides high-class look as if sewing is done with a back-side thread and a front-side thread to people who saw it.

As the "vehicular interior part", the description was given by taking the instrumental panel 1 as an example. The vehicular interior part is not limited thereto but may be a door trim or a side trim. The description was given by taking the synthetic resin material as the skin material 5. However, the skin material 5 is not limited thereto but may be synthetic leather, natural leather or the like.

The through-holes 14 formed in the skin material 5 may be formed under the following conditions, without using the hole-opening needle 9.

(1) If the skin material 5 has shore A hardness of 80 or less, which is a spray skin type that is formed in a coating type and has a thickness of 200 micrometers or less, an olefin type having a thickness of 0.5 millimeters or less, an urethane type, a vinyl chloride type, an acrylonitrile styrene acrylate (ASA) type, a polyester type, or the like, the tip portion 10a of the anchor member 10 penetrates the skin material 5 since the tip portion 10a is sharp.

(2) In the case where the skin material 5 is formed by RIM, the shore A hardness may be set to 65 or less. Thus, even if the thickness of the skin material 5 is 0.5 to 1.5 millimeters, the anchor member 10 penetrates the skin material 5.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

According the invention, a vehicular interior part includes a skin (5) having a front side and the back side opposite to each other. The interior part includes a stitch (4, 10) having a thread (4) stitched to the skin. The thread extends from the front side to the back side to be folded back to the front side through the skin. The stitch includes a stopper (10, 20, 25, 30, 4c1, 4c2) holding the thread against the skin on the back side.

What is claimed is:

1. A vehicular interior part comprising:
    a core, a flexible pad covering the core and a synthetic resinous skin covering the pad, layered each other;
    a thread arranged on a surface side of the skin and having portions inserted in grooves of the pad through through-holes of the skin; and
    stoppers engaging a rear side of the skin for stopping the portions of the thread from coming off from the skin,
    wherein a sewing line is formed along the though-holes.

2. The vehicular interior part according to claim 1,
    wherein the stoppers are firmly held by the portions of the thread in accordance with pitches between the through-holes,
    wherein the stoppers have anchor members having approximately dart-shaped cross sections facilitating the anchor members to be inserted into the through-holes and to engage the rear side of the skin in the grooves.

3. The vehicular interior part according to claim 1,
    wherein the stoppers include adhesives fixed to the portions of thread and having greater sizes than the through-holes do.

4. The vehicular interior part according to claim 1,
    wherein the stoppers include rings with certain widths, the rings having the portions of the thread passing therethrough and engaging the rear side of the skin in the grooves.

5. The vehicular interior part according to claim 1,
    wherein the stoppers include tags with certain widths, the tags folding the portions of the thread in accordance with pitches between the through-holes and engaging the rear side of the skin in the grooves.

6. A method of fabricating a vehicular interior part, comprising:
    forming a layered arrangement with an interior part including a core, a flexible pad covering the core and a synthetic resinous skin covering the pad;
    forming the skin with through-holes;
    forming the pad with grooves coinciding with the through-holes;
    inserting portions of a thread into the grooves through the through-holes; and
    holding the portions of the thread in the grooves by stoppers to form a sewing line along the grooves.

7. The method according to claim 6,
    holding anchor members as the stoppers by pressing members using vacuum suction;
    inserting the pressing members holding the anchor members into the grooves through the through-holes; and
    removing the pressing members from the anchor members to remain the anchor members in the grooves by eliminating vacuum suction force.

* * * * *

UNITED STATES PATENT AND TRADEMARK OFFICE
CERTIFICATE OF CORRECTION

PATENT NO. : 7,661,740 B2
APPLICATION NO. : 11/365931
DATED : February 16, 2010
INVENTOR(S) : Kazuhiro Saito It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Twenty-eighth Day of December, 2010

David J. Kappos
*Director of the United States Patent and Trademark Office*